(12) United States Patent
Ashikhmin et al.

(10) Patent No.: US 7,907,552 B2
(45) Date of Patent: Mar. 15, 2011

(54) MIMO COMMUNICATION SYSTEM WITH USER SCHEDULING AND MODIFIED PRECODING BASED ON CHANNEL VECTOR MAGNITUDES

(75) Inventors: Alexei E. Ashikhmin, Morristown, NJ (US); Jubin Jose, Austin, TX (US); Philip Alfred Whiting, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 171 days.

(21) Appl. No.: 12/195,087

(22) Filed: Aug. 20, 2008

(65) Prior Publication Data

US 2009/0180405 A1 Jul. 16, 2009

Related U.S. Application Data

(60) Provisional application No. 61/011,184, filed on Jan. 15, 2008.

(51) Int. Cl.
*H04J 3/00* (2006.01)
(52) U.S. Cl. ......... 370/280; 370/337; 455/135; 455/134
(58) Field of Classification Search ........................ None
See application file for complete search history.

(56) References Cited

U.S. PATENT DOCUMENTS

| 6,058,105 | A | 5/2000 | Hochwald et al. |
| 6,307,882 | B1 | 10/2001 | Marzetta |
| 6,327,310 | B1 | 12/2001 | Hochwald et al. |
| 6,330,460 | B1 | 12/2001 | Wong et al. |
| 2004/0192216 | A1 | 9/2004 | Marzetta et al. |
| 2005/0265290 | A1 | 12/2005 | Hochwald et al. |
| 2007/0177494 | A1 | 8/2007 | Tomizawa |
| 2008/0101310 | A1 | 5/2008 | Marzetta |

FOREIGN PATENT DOCUMENTS

WO PCT/US2007/022395 3/2008

OTHER PUBLICATIONS

Multiplexing, Scheduling, and Multicasting Strategies for Antenna Arrays in Wireless Networks by Michael J. Lopez, Massachusetts Institute of Technology Aug. 30, 2002.*
M. Airy et al., "Transmit Precoding for the Multiple Antenna Broadcast Channel," IEEE 63rd Vehicular Technology Conference, May 2006, pp. 1396-1400, vol. 3.

(Continued)

*Primary Examiner* — Chi H Pham
*Assistant Examiner* — Kouroush Mohebbi
(74) *Attorney, Agent, or Firm* — Ryan, Mason & Lewis, LLP

(57) ABSTRACT

A multiple-input, multiple-output (MIMO) communication system is configured to perform user scheduling and associated precoding. The system includes multiple terminals and at least one base station configured to communicate with the terminals. The base station is operative to obtain channel vectors for respective ones of the terminals, to select a subset of the terminals based on magnitudes of the respective channel vectors, to compute a precoding matrix using the channel vectors of the selected subset of terminals, and to utilize the preceding matrix to control transmission to the selected subset of terminals. The system may be, for example, a time-division duplex (TDD) multi-user MIMO system in which the multiple terminals comprise autonomous single-antenna terminals.

24 Claims, 3 Drawing Sheets

OTHER PUBLICATIONS

M. Airy et al., "Multi-User Diversity for the Multiple Antenna Broadcast Channel with Linear Receivers: Asymptotic Analysis," 38th Asilomar Conference on Signals, Systems and Computers, Nov. 2004, pp. 886-890, vol. 1.

F. Boccardi et al., "Precoding Schemes for the MIMO-GBC," International Zurich Seminar on Communications, Feb. 2006, pp. 10-13.

G. Caire et al., "On the Achievable Throughput of a Multiantenna Gaussian Broadcast Channel," IEEE Transactions on Information Theory, Jul. 2003, pp. 1691-1706, vol. 49, No. 7.

G.J. Foschini, "Layered Space-Time Architecture for Wireless Communication in a Fading Environment When Using Multi-Element Antennas," Bell Labs Technical Journal, Oct. 1996, pp. 41-59, vol. 1.

A. Goldsmith et al., "Capacity Limits of MIMO Channels," IEEE Journal on Selected Areas in Communications, Jun. 2003, pp. 684-702, vol. 21, No. 5.

G.A. Gupta et al., "Power Allocation Over Parallel Gaussian Multiple Access and Broadcast Channels," IEEE Transactions on Information Theory, Jul. 2006, pp. 3274-3282, vol. 52, No. 7.

B. Hassibi et al., "How Much Training is Needed in Multiple-Antenna Wireless Links?," IEEE Transactions on Information Theory, Apr. 2003, pp. 951-963, vol. 49, No. 4.

B. Hochwald et al., "Space-Time Multiple Access: Linear Growth in the Sum Rate," Allerton Conference on Communication, Control and Computing, Oct. 2002, 10 pages.

K. Jagannathan et al., "Scheduling of Multi-Antenna Broadcast Systems with Heterogeneous Users," IEEE Journal on Selected Areas in Communications, Sep. 2007, pp. 1424-1434, vol. 25, No. 7.

N. Jindal et al., "Dirty-Paper Coding Versus TDMA for MIMO Broadcast Channels," IEEE Transactions on Information Theory, May 2005, pp. 1783-1794, vol. 51, No. 5.

N. Jindal et al., "Sum Power Iterative Water-Filling for Multi-Antenna Gaussian Broadcast Channels," IEEE Transactions on Information Theory, Apr. 2005, pp. 1570-1580, vol. 51, No. 4.

J. Lee et al., "Symmetric Capacity of MIMO Downlink Channels," IEEE International Symposium on Information Theory, Jul. 2006, 5 pages.

T.L. Marzetta, "How Much Training is Required for Multiuser MIMO?" 40th Asilomar Conference on Signals, Systems and Computers, Oct.-Nov. 2006, pp. 359-363.

T.L. Marzetta, "BLAST Training: Estimating Channel Characteristics for High Capacity Space-Time Wireless," 37th Annual Allerton Conference on Communication, Control, and Computing, Sep. 1999, 9 pages.

M. Medard, "The Effect Upon Channel Capacity in Wireless Communications of Perfect and Imperfect Knowledge of the Channel," IEEE Transactions on Information Theory, May 2000, pp. 933-946, vol. 46, No. 3.

M. Sharif et al., "A Comparison of Time-Sharing, DPC, and Beamforming for MIMO Broadcast Channels with Many Users," IEEE Transactions on Communications, Jan. 2007, pp. 1-14, vol. 55, No. 1.

M. Sharif et al., "Differentiated Rate Scheduling for Gaussian Broadcast Channels," International Symposium on Information Theory, Sep. 2005, 5 pages.

M. Sharif et al., "On the Capacity of MIMO Broadcast Channels with Partial Side Information," IEEE Transactions on Information Theory, Feb. 2005, pp. 506-522, vol. 51, No. 2.

M. Sharif et al., "Scaling Laws of Sum Rate Using Time-Sharing, DPC, and Beamforming for MIMO Broadcast Channels," International Symposium on Information Theory, Jun.-Jul. 2004, p. 177.

Z. Shen et al., "Low Complexity User Selection Algorithms for Multiuser MIMO Systems with Block Diagonalization," 39th Asilomar Conference on Signals, Systems and Computers, Oct.-Nov. 2005, pp. 628-632.

I.E. Telatar, "Capacity of Multi-Antenna Gaussian Channels," European Transactions on Telecommunications, Nov. 1999, pp. 1-28.

A. Vakili et al., "Differentiated Rate Scheduling for MIMO Broadcast Channels," 43rd Annual Allerton Conference on Communication, Control and Computing, Sep. 2005, 10 pages.

S. Vishwanath et al., "Duality, Achievable Rates, and Sum-Rate Capacity of Gaussian MIMO Broadcast Channels," IEEE Transactions on Information Theory, Oct. 2003, pp. 2658-2668, vol. 49, No. 10.

P. Viswanath et al., "Sum Capacity of the Vector Gaussian Broadcast Channel and Uplink-Downlink Duality," IEEE Transactions on Information Theory, Aug. 2003, pp. 1912-1921, vol. 49, No. 8.

P. Viswanath et al., "Opportunistic Beamforming Using Dumb Antennas," IEEE Transactions on Information Theory, Jun. 2002, pp. 1277-1294, vol. 48, No. 6.

H. Viswanathan et al., "Downlink Capacity Evaluation of Cellular Networks with Known-Interference Cancellation," Jun. 2003, pp. 802-811, vol. 21, No. 5.

H. Weingarten et al., "The Capacity Region of the Gaussian Multiple-Input Multiple-Output Broadcast Channel," IEEE Transactions on Information Theory, Sep. 2006, pp. 3936-3964, vol. 52, No. 9.

T. Yoo et al., "On the Optimality of Multiantenna Broadcast Scheduling Using Zero-Forcing Beamforming," IEEE Journal on Selected Areas in Communications, Mar. 2006, pp. 528-541, vol. 24, No. 3.

\* cited by examiner

100

MIMO COMMUNICATION SYSTEM WITH USER SCHEDULING AND MODIFIED PRECODING BASED ON CHANNEL VECTOR MAGNITUDES

RELATED APPLICATION

The present application claims the priority of U.S. Provisional Application Ser. No. 61/011,184, filed Jan. 15, 2008 and entitled "Efficient Scheduling in Time Division Duplex (TDD) Multiple Input Multiple Output (MIMO) Broadcast," the disclosure of which is incorporated by reference herein.

FIELD OF THE INVENTION

The present invention relates generally to communication systems, and more particularly to MIMO communication systems.

BACKGROUND OF THE INVENTION

In a typical multi-user MIMO communication system, a multi-antenna array in a base station sends multiple data streams selectively and simultaneously to autonomous single-antenna terminals, also referred to as "users," thereby achieving throughput gains relative to a set of single-antenna links. Multi-user systems of this type are sometimes referred to as "broadcast" MIMO systems. The converse to broadcast MIMO is sometimes referred to as "multiple access" MIMO, and it entails the autonomous single-antenna terminals sending multiple data streams simultaneously to the multi-antenna array in the base station.

One drawback of multi-user MIMO systems is that the base station has to know the propagation characteristics of the forward channel. The process through which the base station obtains this information is generally referred to as training. See, for example, U.S. Patent Application Publication No. 2005/0265290 to Hochwald et al. entitled "Feedback Method for Channel State Information of a Wireless Link," which is commonly assigned herewith and incorporated by reference herein. Each of the single-antenna terminals may generate forward channel state information in the form of a corresponding channel vector which characterizes the channel between the base station and that terminal. The channel vectors may be based on measurements made by the terminals using pilot signals transmitted by the base station over the forward channel. The terminals transmit their respective channel vectors back to the base station over the reverse channel. These channel vectors collectively form what is referred to as a forward channel matrix. The base station includes a precoder that adjusts forward channel signals prior to transmission in accordance with an inverse of the forward channel matrix. Precoding processes such as this, which are also generally referred to as "preconditioning," advantageously tend to offset any adverse impacts of the forward channel on the transmitted signals.

It is well known that the acquisition of forward channel state information by the base station can be considerably facilitated through the use of time-division duplex (TDD) operation. In the TDD context, the principle of reciprocity implies that the reverse channel matrix is equal to the transpose of the forward channel matrix, so the base station can readily obtain the required forward channel state information by simply processing pilot signals transmitted by the terminals over the reverse channel. Thus, TDD operation avoids the need for the terminals to generate channel vectors and transmit such channel vectors back to the base station. Instead, such channel vectors are generated by the base station from the reverse channel pilot signals.

By way of contrast, in frequency division duplex (FDD) operation, the principle of reciprocity generally does not apply, and the generation and transmission of the above-noted channel vectors remains a requirement. The amount of overhead involved may be prohibitive, especially when the number of terminals is large, or when the channel characteristics are changing rapidly due to terminal mobility.

Despite the fact that the determination of forward channel state information is much simpler in the TDD context than in the FDD context, a need nonetheless remains for improvements in conventional TDD MIMO systems, particularly in terms of user scheduling and precoding.

SUMMARY OF THE INVENTION

The present invention in illustrative embodiments provides improvements in user scheduling and preceding in TDD MIMO systems.

The system in the above-noted illustrative embodiments is a multi-user MIMO system in which the multiple terminals comprise autonomous single-antenna terminals. More specifically, in the multi-user MIMO system of the illustrative embodiments, the base station communicates with the multiple terminals via a set of M antennas and the multiple terminals comprise K single-antenna terminals. In other embodiments, one or more of the terminals may each comprise multiple antennas, rather than a single antenna.

In accordance with an aspect of the invention, a MIMO system includes multiple terminals and at least one base station configured to communicate with the terminals. The base station is operative to obtain channel vectors for respective ones of the terminals, to select a subset of the terminals based on magnitudes of the respective channel vectors, to compute a preceding matrix using the channel vectors of the selected subset of terminals, and to utilize the precoding matrix to control transmission to the selected subset of terminals. In an illustrative embodiment of this aspect, the base station selects from among K terminals those N terminals having the largest channel vector magnitudes, where N<K. This selection process may involve, for example, forming an N×M matrix $\hat{H}_{S_N} = [\hat{h}_{(1)} \hat{h}_{(2)} \ldots \hat{h}_{(N)}]^T$ where $\hat{h}_{(1)}^T, \hat{h}_{(2)}^T, \ldots, \hat{h}_{(K)}^T$ comprise rows of an estimated forward channel matrix $\hat{H}$ arranged in order of decreasing channel vector magnitudes.

In accordance with another aspect of the invention, a MIMO system includes multiple terminals and at least one base station configured to communicate with the terminals. The base station is operative to obtain channel vectors for respective ones of the terminals, to compute a precoding matrix using the channel vectors, and to utilize the precoding matrix to control transmission to the terminals, where the preceding matrix is computed as a function of a product of a diagonal matrix and an estimated forward channel matrix. In an illustrative embodiment of this aspect, the preceding matrix is computed as $$A_D = \frac{\hat{H}_D^+ (\hat{H}_D \hat{H}_D^+)^{-1}}{\sqrt{tr[(\hat{H}_D \hat{H}_D^+)^{-1}]}}$$

where $\hat{H}_D = D\hat{H}$, $\hat{H}$ denotes the estimated forward channel matrix, $$D = \text{diag}\{[p_1^{-\frac{1}{2}} p_2^{-\frac{1}{2}} \ldots p_K^{-\frac{1}{2}}]\},$$

and $p=[p_1\ p_2\ \ldots\ p_K]^T$ is a vector of non-negative real numbers that may be selected to approximately maximize a lower bound on forward channel weighted sum capacity.

Advantageously, the scheduling and preceding approaches of the above-noted illustrative embodiments provide significantly improved throughput in TDD MIMO systems relative to conventional such systems. This throughput improvement is achieved without requiring any increase in transmission power or other system resource.

These and other features and advantages of the present invention will become more apparent from the accompanying drawings and the following detailed description.

DETAILED DESCRIPTION OF THE INVENTION

The present invention will be illustrated below in conjunction with exemplary TDD multi-user MIMO systems and associated techniques for user scheduling and preceding. It should be understood, however, that the invention is not limited to use with any particular type of MIMO system, or user scheduling and preceding techniques. The disclosed techniques are suitable for use with a wide variety of other MIMO systems which utilize various types of scheduling and preceding, and in numerous alternative applications.

It should be noted that the scheduling and preceding techniques of the invention may be used separately from one another, and both need not be present in any particular embodiment of the present invention. Thus, for example, a given embodiment of the present invention may utilize the scheduling techniques as described herein with otherwise conventional preceding techniques, or the preceding techniques as described herein with otherwise conventional scheduling techniques.

Aspects of the present invention may be implemented in otherwise conventional wireless networks such as cellular, Wi-Fi or WiMax networks, or in a wide variety of other types of wireless communication systems. The term "base station" as used herein is therefore intended to be construed broadly so as to encompass, by way of example, an access point of a wireless network, or any other type of wireless communication system entity which utilizes MIMO techniques to communicate with multiple users.

Figure 1:
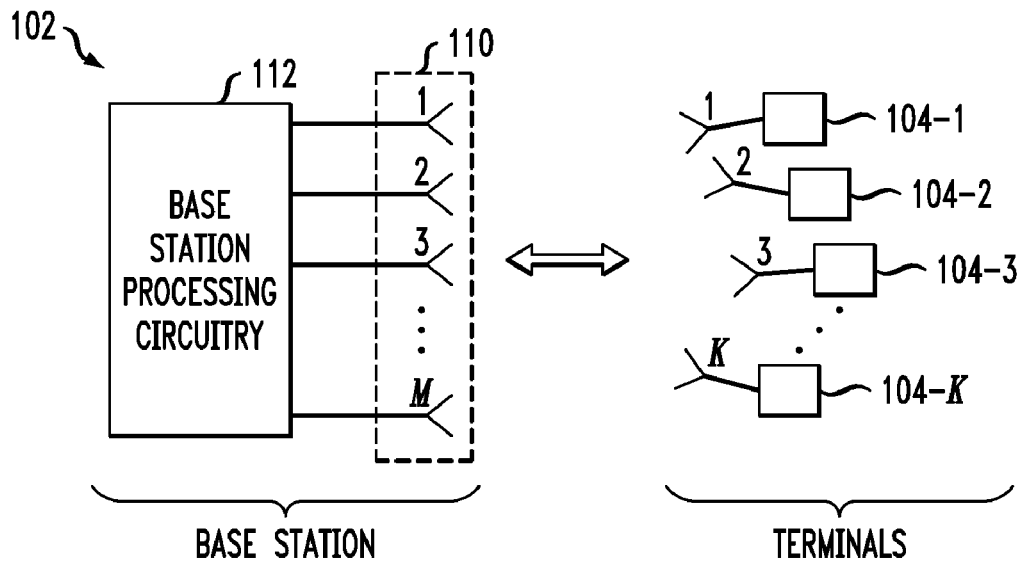
FIG. 1 is a simplified diagram of a multi-user MIMO communication system in an illustrative embodiment of the invention.

FIG. 1 shows a multi-user MIMO system 100 comprising a base station 102 which communicates with a plurality of wireless terminals more particularly denoted as 104-1, 104-2, ... 104-K each equipped with a single antenna denoted as 1, 2, 3, ... K. These terminals are also referred to herein as "users." The terminals may be, for example, mobile telephones, portable computers, wireless email devices, personal digital assistants (PDAs) or other user communication devices, in any combination. The base station 102 includes an antenna array 110 comprising M antennas as shown, and base station processing circuitry 112. The base station 102 transmits information to the terminals 104 via a forward link or downlink, and receives information from the terminals 104 via a reverse link or uplink.

In other embodiments, one or more of the terminals 104 may each comprise multiple antennas, rather than a single antenna as in the present illustrative embodiment. Those skilled in the art will appreciate that the techniques disclosed herein can be adapted in a straightforward manner for use with one or more such multi-antenna terminals.

Of course, a given MIMO system may include multiple base stations, each serving a number of different arrangements of terminals of various types.

It will be assumed for purposes of illustration that the system 100 operates in a TDD mode, although such operation is not a requirement of the invention. As noted above, the reciprocity principle generally applies in the TDD context, and so the base station is able to obtain adequate forward channel state information simply by processing reverse link pilot signals transmitted by the terminals. Such pilot signals are examples of what are more generally referred to herein as "training signals" or "training sequences." The present illustrative embodiment provides improved throughput in a TDD MIMO system through user scheduling and precoding techniques that will be described in greater detail below.

Figure 2:
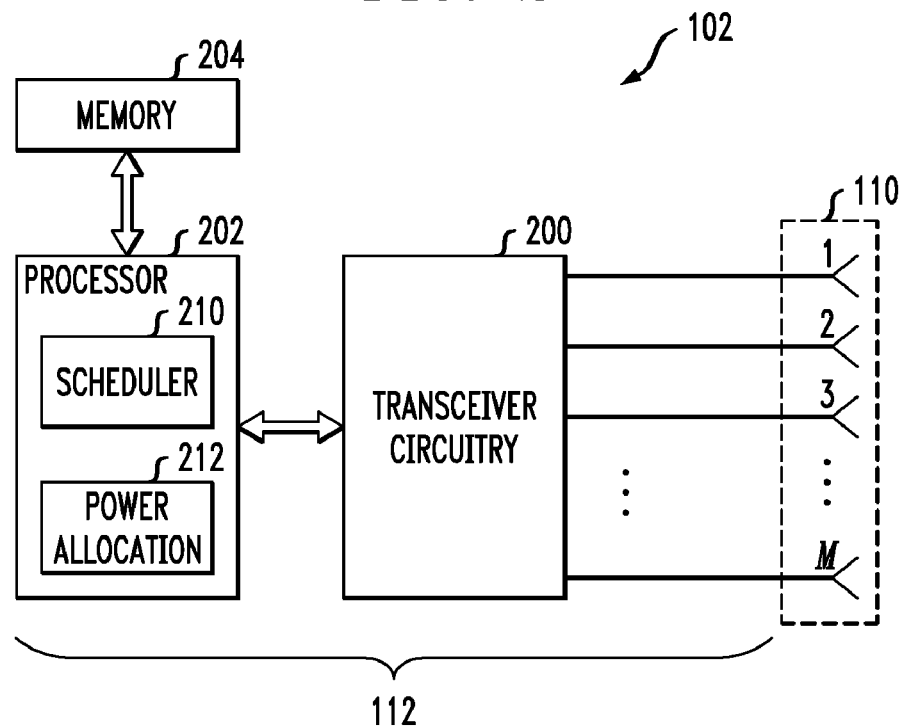
FIG. 2 shows a more detailed view of one possible implementation of a base station of the FIG. 1 system.

FIG. 2 shows a more detailed view of one possible configuration of the base station 102 of multi-user MIMO system 100. In this embodiment, the base station 102 comprises transceiver circuitry 200, a processor 202 and a memory 204. The transceiver circuitry 200 may be coupled to the M antennas of the antenna array 110 via respective forward link transmit power amplifiers and receive link receive preamplifiers, although such elements are omitted from the figure for clarity of illustration. A variety of additional or alternative conventional transceiver elements may be incorporated into the transceiver circuitry 200, as will be appreciated by those skilled in the art. The processor 202 implements a number of processing elements including a scheduler element 210 and a power allocation element 212. The operation of these elements will be described in greater detail below in conjunction with the description of the user scheduling and preceding techniques.

One or more software programs for implementing user scheduling and preceding techniques as described herein may be stored in memory 204 and executed by processor 202. The scheduler and power allocation elements 210 and 212 of the processor 202 may thus represent functional software components executed by the processor. The processor 202 may comprise multiple integrated circuits, digital signal processors or other types of processing devices, and associated supporting circuitry, in any combination. Numerous alternative arrangements of hardware, software or firmware in any combination may be utilized in implementing the base station 102 or particular elements thereof. The memory 204 may be viewed as an example of what is more generally referred to herein as a "processor-readable storage medium."

Figure 3:
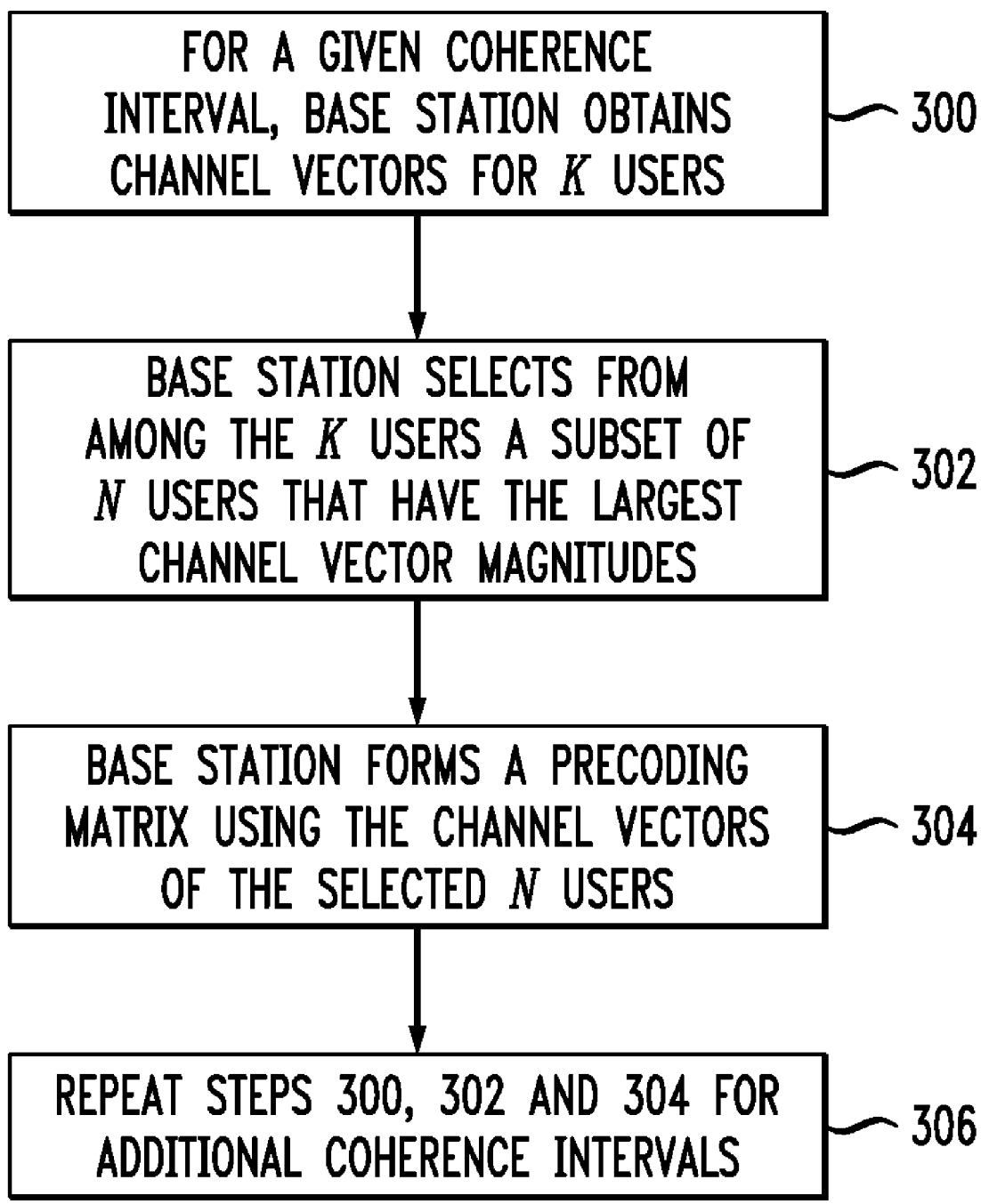
FIG. 3 is a flow diagram of an exemplary user scheduling process implemented in the FIG. 1 system.

Referring now to FIG. 3, an illustrative process for scheduling users in the multi-user MIMO system 100 is shown. In this embodiment, each user is assumed to be one of the K terminals of system 100.

In step 300, the base station 102 obtains channel vectors for respective ones of the K users 104 for a given coherence interval. The coherence interval denotes a time period, typically specified as a particular number of symbols T, for which channel characteristics such as fading are assumed to remain constant. The base station may obtain the channel vectors using any of a variety of different techniques. For example, as the system 100 is assumed to be a TDD system in the present embodiment, the base station can obtain such vectors by processing pilot signals transmitted by the terminals over the reverse channel, as will be described in greater detail below. Numerous other techniques for obtaining channel vectors are well known in the art, and accordingly will not be described in detail herein.

In step 302, the base station 102 selects a subset of the K terminals 104 based on magnitudes of their respective channel vectors. More particularly, the base station selects, from among the K terminals, a subset of N terminals that have the largest channel vector magnitudes of the K terminals, where N<K. In other embodiments, alternative types of selection based on channel vector magnitudes may be implemented. The magnitude of a channel vector is also referred to herein as the "norm" of a channel vector. The selection operation of step 302 is an example of what is more generally referred to herein as a scheduling operation. Thus, the identified subset is a subset of the K users that the base station will consider for scheduling in a given scheduling interval. The scheduling interval in the present embodiment is assumed to correspond to the above-noted coherence interval. The scheduling intervals may comprise time slots, although such time slot scheduling is not required.

In step 304, the base station 102 computes a precoding matrix using the channel vectors of the selected N terminals 104. Examples of this preceding matrix will be described in greater detail below. The phrase "computing a preceding matrix" is intended to be construed broadly, so as to encompass, for example, an arrangement in which the base station computes individual elements which collectively may be viewed as characterizing such a precoding matrix. As will be described, the base station utilizes the preceding matrix to control transmission to the selected subset of N terminals. For example, the base station may utilize the preceding matrix to allocate transmission power among the identified subset of N terminals.

In step 306, the above-described steps 300, 302 and 304 are repeated for additional coherence intervals. Thus, the selection operation in step 302 may potentially result in different subsets of N terminals being selected from the set of K terminals in each of the coherence intervals, based on changes in the channel vector magnitudes from coherence interval to coherence interval.

As mentioned above, the steps 300 through 304 in FIG. 3 are generally associated with a single scheduling interval, such as a time slot. Thus, the users of the identified subset as determined in step 302 are served in that scheduling interval. The process is repeated for other coherence intervals in step 306, each of which may represent a separate scheduling interval.

The base station operations associated with the process as illustrated in FIG. 3 may be implemented using one or more software programs stored in memory 204 and executed by processor 202, as previously indicated. The wireless terminal operations associated with the FIG. 3 process may similarly be implemented in software stored and executed by respective memory and processor elements of the wireless terminals.

Detailed examples of scheduling and preceding techniques implemented in the system 100 will now be described. In these examples, particular MIMO system models, characteristics and operating parameters are assumed for illustrative purposes. It should be emphasized, however, that these and any other assumptions made herein are not requirements of the invention, and need not apply in other embodiments.

In the examples to be described, bold font variables denote vectors or matrices. All vectors are column vectors. The notations $(\cdot)^T$, $(\cdot)^*$, $(\cdot)^\dagger$ and $\mathrm{tr}(\cdot)$ denote transpose, conjugate, Hermitian conjugate and trace, respectively. The notations $\mathbb{E}[\cdot]$ and $\mathrm{var}\{\cdot\}$ stand for expectation and variance operations, respectively. The notation $\mathrm{diag}\{a\}$ stands for the L×L diagonal matrix with diagonal entries equal to the L components of a.

As described above, base station 102 in the illustrative embodiment comprises M antennas that communicate with K autonomous single-antenna terminals 104 on both forward and reverse links. The terminals 104 will also be referred to as "users" in the following description. The forward channel is characterized by K×M propagation matrix H. We assume independent Rayleigh fading channels, which remain constant over a coherence interval of T symbols. The entries of the channel matrix H are independent and identically distributed (i.i.d.) zero-mean, circularly-symmetric complex Gaussian CN(0,1) random variables. This model incorporates frequency selectivity of fading by using orthogonal frequency-division multiplexing (OFDM). Note that the duration of the coherence interval in symbols is chosen for the OFDM subband. Due to reciprocity, we assume that the reverse channel at any instant is the transpose of the forward channel.

Let the forward and reverse SINRs associated with the $k^{th}$ user 104 be $\rho_{fk}$ and $\rho_{rk}$, respectively. These forward and reverse SINRs are assumed to remain fixed for the corresponding channel user. On the forward link, the signal received by the $k^{th}$ user is $$x_{fk} = \sqrt{\rho_{fk}} h_k^T s_f + w_{fk} \tag{1}$$

where $h_k^T$ is the $k^{th}$ row of the channel matrix H and $s_f$ is the M×1 vector in which information symbols to be communicated are embedded. The components of the additive noise vector $[w_{f1} w_{f2} \ldots w_{fK}]$ are i.i.d. CN(0,1). The average power constraint at the base station 102 during transmission is $\mathbb{E}[\|s_f\|^2]=1$ so that the total transmit power is fixed irrespective of its number of antennas. On the reverse link, the vector received at the base station is $$x_r = H^T E_r s_r + w_r \tag{2}$$

where $s_r$ is the signal vector transmitted by the users and $E_r = \mathrm{diag}\{[\sqrt{\rho_{r1}}\sqrt{\rho_{r2}} \ldots \sqrt{\rho_{rK}}]^T\}$. The components of the additive noise $w_r$ are i.i.d. CN(0,1). There is assumed to be a power constraint at every user during transmission given by $\mathbb{E}[\|s_{rk}\|^2]=1$ where $s_{rk}$ is the $k^{th}$ component of $s_r$.

The channel vectors may be obtained in step 300 of the FIG. 3 process using channel estimation performed in the following manner. As mentioned above, reciprocity is one of the key advantages of TDD systems over FDD systems. We exploit this property to perform channel estimation by transmitting training sequences on the reverse link. Every user 104 transmits a sequence of training signals of $\tau_{rp}$ symbols duration in every coherence interval. We assume that these training sequences are known a priori to the base station 102. The $k^{th}$ user transmits the training sequence vector $\sqrt{\tau_{rp}} \psi_k^\dagger$. We use orthonormal sequences which implies $\psi_i^\dagger \psi_j = \delta_{ij}$ where $\delta_{ij}$ is the Kronecker delta. The use of orthogonal sequences restricts the maximum number of users to $\tau_{rp}$, i.e., $K \leq \tau_{rp}$.

The corrupted sequence of training signals received at the base station 102 is $$Y_r = \sqrt{\tau_{rp}} H^T E_r \Psi^\dagger + V_r \tag{3}$$

where $\tau_{rp} \times K$ matrix $\Psi = [\psi_1 \psi_2 \ldots \psi_K]$ and the components of $M \times \tau_{rp}$ additive noise matrix $V_r$ are i.i.d. $CN(0,1)$. The base station obtains the linear minimum-mean-square-error (LMMSE) estimate of the channel $$\hat{H} = \text{diag}\left\{\left[\sqrt{\frac{\rho_{r1}\tau_{rp}}{1+\rho_{r1}\tau_{rp}}} \ldots \sqrt{\frac{\rho_{rK}\tau_{rp}}{1+\rho_{rK}\tau_{rp}}}\right]^T\right\}\Psi^T Y_r^T. \quad (4)$$

This estimate $\hat{H}$ is the conditional mean of $H$ and hence, the MMSE estimate as well. By the properties of conditional mean and joint Gaussian distribution, the estimate $\hat{H}$ is independent of the estimation error $\tilde{H} = H - \hat{H}$. The components of $\hat{H}$ are independent and the elements of its $k^{th}$ row are $$CN\left(0, \frac{\rho_{rk}\tau_{rp}}{1+\rho_{rk}\tau_{rp}}\right).$$

In addition, the components of $\tilde{H}$ are independent and the elements of its $k^{th}$ row are $$CN\left(0, \frac{1}{1+\rho_{rk}\tau_{rp}}\right).$$

We will now focus on the special case of homogeneous users. In this case, it is assumed that forward SINRs from the base station 102 to all users 104 are equal and also that reverse SINRs from all users to the base station are equal, i.e., $\rho_{f1} = \ldots = \rho_{fK} = \rho_f$ and $\rho_{r1} = \ldots = \rho_{rK} = \rho_r$.

As indicated in the FIG. 3 process, the base station 102 performs scheduling and precoding for the forward link. The base station selects a subset of N users among the K users and precodes the information signals to be transmitted to these N users. It should be noted that for certain coherence intervals, the base station may select N=K users. Thus, the value of N may be less than or equal to K. The scheduling strategy used to select the users will be explained in greater detail below. Let the set of users selected be $S_N \subseteq \{1, 2, \ldots, K\}$ with N distinct entries. The base station forms the M×1 transmission signal vector $s_f$, which drives the antennas 110, from the information symbol vector $q = [q_1 q_2 \ldots q_N]^T$ for the selected users by premultiplying it with a precoding matrix. We use the preceding matrix $$A_{S_N} = \frac{\hat{H}_{S_N}^\dagger (\hat{H}_{S_N} \hat{H}_{S_N}^\dagger)^{-1}}{\sqrt{tr[(\hat{H}_{S_N} \hat{H}_{S_N}^\dagger)^{-1}]}} \quad (5)$$

which is proportional to the pseudo-inverse of the estimated channel. The N×M matrix $\hat{H}_{S_N}$ is formed by the rows in set $S_N$ of matrix $\hat{H}$. We use this preceding matrix because of the lack of any channel knowledge at the users. The precoding matrix is normalized so that $tr(A_{S_N}^\dagger A_{S_N}) = 1$.

The transmission signal vector is given by $$s_f = A_{S_N} q \quad (6)$$

and the power constraint at the base station 102 is satisfied by imposing the condition $\mathbb{E}[\|q_n\|^2] = 1, \forall n \in \{1, \ldots, N\}$. From (1) and (6), we obtain the signal vector received at the selected users as $$x_f = \sqrt{\rho_f} H_{S_N} A_{S_N} q + w_f \quad (7)$$

where $H_{S_N}$ is the matrix formed by the rows in set $S_N$ of the matrix $H$.

A lower bound on the sum capacity of the system in the present embodiment may be obtained in the following manner. The lower bound holds for any scheduling strategy used at the base station 102 which selects a fixed number of users 104. Recall that the base station performs channel estimation as described previously. For this illustrative system, every selected user can achieve a downlink rate during data transmission of at least $$C_{ind\text{-}lb} = \log_2\left(1 + \frac{\rho_f \mathbb{E}^2[\chi]}{1 + \rho_f\left(\frac{1}{1+\rho_r\tau_{rp}} + \text{var}\{\chi\}\right)}\right) \quad (8)$$

bits/transmission where $\chi$ is a scalar random variable given by $$\chi = \left(tr\left[(\hat{H}_{S_N} \hat{H}_{S_N}^\dagger)^{-1}\right]\right)^{-\frac{1}{2}}.$$

It can also be shown that for the system with homogeneous users, a lower bound on the sum capacity is $$C_{sum\text{-}lb} = \max_{N \leq K, N \in \mathbb{I}^+} N \cdot C_{ind\text{-}lb}. \quad (9)$$

The scheduling strategy in the present embodiment will now be described in greater detail. The need for explicit scheduling arises due the use of pseudo-inverse based precoding of the information symbols. With perfect channel knowledge at the base station ($\hat{H} = H$) and no scheduling (N=K), the pseudo-inverse based preceding diagonalizes the effective forward channel and every user sees a statistically identical effective channel irrespective of its actual channel. The inability to vary the effective gains to the users depending on their channel states is due to lack of any channel knowledge at the users. This possibly causes a reduction in achievable sum rate. The present embodiment addresses this problem by using a scheduling strategy which explicitly selects $N \leq K$ users before preceding, as indicated previously in conjunction with step 302 of FIG. 3 and further described below.

In every coherence interval, the channel estimate at the base station 102 is used to select the N users with largest estimated channel gains. Let $\hat{h}_{(1)}^T, \hat{h}_{(2)}^T, \ldots, \hat{h}_{(K)}^T$ be the norm-ordered rows of the estimated channel matrix $\hat{H}$. Then, the matrix $\hat{H}_{S_N}$ is given by $\hat{H}_{S_N} = [\hat{h}_{(1)} \hat{h}_{(2)} \ldots \hat{h}_{(N)}]^T$ and the lower bound in (8) becomes $$C_{ind\text{-}lb} = \log_2\left(1 + \frac{\rho_f\left(\frac{\rho_r\tau_{rp}}{1+\rho_r\tau_{rp}}\right)\mathbb{E}^2[\eta]}{1 + \rho_f\left(\frac{1}{1+\rho_r\tau_{rp}} + \frac{\rho_r\tau_{rp}}{1+\rho_r\tau_{rp}}\text{var}\{\eta\}\right)}\right). \quad (10)$$

Here, random variable $$\eta = (tr[(UU^\dagger)^{-1}])^{-\frac{1}{2}}$$

where U is the N×M matrix formed by the N rows with largest norms of a K×M random matrix Z whose elements are i.i.d. CN(0,1).

A net achievable sum rate may be specified to account for the reduction in achievable sum rate due to training. For example, it may be assumed that, in every coherence interval of T symbols, the first $\tau_{rp}$ symbols are used for training on reverse link, one symbol is used for computation, and the remaining $T-\tau_{rp}-1$ symbols are used for transmitting information symbols. The number of users K and the training length $\tau_{rp}$ can be chosen such that net throughput of the system is maximized. Thus, net achievable sum rate is defined as $$C_{net}(M, \rho_f, \rho_r) = \max_{K,\tau_{rp}} \frac{T - \tau_{rp} - 1}{T} C_{sum-lb}(\cdot) \quad (11)$$

subject to the constraints $K \leq \tau_{rp}$ and $\tau_{rp} \leq \min(M,T-2)$. The element $C_{sum-lb}(\cdot)$ in (11) is given by (9).

We now consider the general case of heterogenous users. Moreover, we address the problem of maximizing achievable weighted sum rate. The motivation behind this problem is that many algorithms implemented in layers above the physical layer assign weights to each user depending on various factors. We assume that any such weights are predetermined and known. We will describe a modified preceding method and derive an optimized precoding matrix under an M-large assumption. We further combine this with a scheduling strategy to obtain an improved lower bound on the weighted sum capacity.

The modified preceding will now be described. The base station 102 obtains the M×1 transmission signal vector $s_f$ by premultiplying the information symbols $q=[q_1 \; q_2 \; \ldots \; q_K]^T$ with a precoding matrix as explained previously. In this embodiment, a modified preceding matrix is given by $$A_D = \frac{\hat{H}_D^\dagger (\hat{H}_D \hat{H}_D^\dagger)^{-1}}{\sqrt{tr[(\hat{H}_D \hat{H}_D^\dagger)^{-1}]}} \quad (12)$$

where $\hat{H}_D = D\hat{H}$ and $$D = \text{diag}\left\{\left[p_1^{-\frac{1}{2}} p_2^{-\frac{1}{2}} \ldots p_K^{-\frac{1}{2}}\right]\right\}.$$

The choice of D will be explained in detail below. From (1), we obtain the signal vector received at the users $$x_f = E_f H A_D q + w_f \quad (13)$$

where $E_f = \text{diag}\{[\sqrt{\rho_{f1}}\sqrt{\rho_{f2}} \ldots \sqrt{\rho_{fK}}]^T\}$.

The lower bound on sum capacity previously described will now be generalized to heterogeneous users and weighted sum rate. For the system in the present embodiment, a lower bound on the forward link weighted sum capacity during transmission is given by $$C_{wt-lb} = \sum_{k=1}^{K} w_k \log_2\left(1 + \frac{\rho_{fk} p_k \mathbb{E}^2[\phi_F]}{1 + \rho_{fk}\left(\frac{1}{1+\rho_{rk}\tau_{rp}} + p_k \text{var}\{\phi_F\}\right)}\right). \quad (14)$$

Here, random variable $\phi_F$ is given by $$\phi_F = (tr[(FZZ^\dagger F)^{-1}])^{-\frac{1}{2}} \quad (15)$$

where $$F = D \cdot \text{diag}\left\{\left[\sqrt{\frac{\rho_{r1}\tau_{rp}}{1+\rho_{r1}\tau_{rp}}} \; \ldots \; \sqrt{\frac{\rho_{rK}\tau_{rp}}{1+\rho_{rK}\tau_{rp}}}\right]^T\right\}$$

and Z is the K×M random matrix whose elements are i.i.d. CN(0,1).

We wish to choose the matrix D such that $C_{wt-lb}$ in (14) is maximized. However, this problem is hard to analyze. Accordingly, we consider the asymptotic regime $M/K \gg 1$. Apart from making the problem mathematically tractable, this asymptotic regime is interesting due to the following two reasons. First, numerical results based on the present embodiment indicate that extra base station antennas are always beneficial. Second, the system imposed constraints $K \leq \tau_{rp}$ and $\tau_{rp} \leq T$ restrict the value of K.

It is known that $\lim_{M/K \to \infty} ZZ^\dagger \to MI_K$ where Z is the K×M random matrix whose elements are i.i.d. CN(0,1). Therefore, under M-large approximation, random variable $\phi_F$ in (15) can be approximated to $$\phi_F \approx \sqrt{\frac{M}{tr(F^{-2})}} \quad (16)$$

which is a constant. Substituting (16) in (14), we get $$C_{wt-lb} \approx J(p) = \sum_{i=1}^{K} w_i \log_2\left(1 + \frac{\beta_i p_i}{\sum_{j=1}^{K} \alpha_j p_j}\right) \quad (17)$$

where $$\alpha_j = \left(\frac{\rho_{rj}\tau_{rp}}{1+\rho_{rj}\tau_{rp}}\right)^{-1}$$

and $$\beta_i = \frac{M\rho_{fi}}{1+\rho_{fi}(1+\rho_{ri}\tau_{rp})^{-1}}.$$

Let $p=[p_1 \; p_2 \; \ldots \; p_K]^T$ be any vector of non-negative real numbers and $p^* = \arg\max_p J(p)$ then the set of possible values of $p^* = c\bar{p}^*$ where c is any positive real number and $\bar{p}^* = [\bar{p}^*_1 \; \bar{p}^*_2 \; \ldots \; \bar{p}^*_K]^T$ such that $$\bar{p}^*_i = \left(\frac{w_i}{\lambda^* \alpha_i} - \frac{1}{\beta_i}\right)^+. \quad (18)$$

The positive real number λ* is chosen such that the constraint $$\sum_{i=1}^{K} \alpha_i \bar{p}_i^* = 1$$

is satisfied. We use Lagrange multipliers to obtain this result.

The optimized $\bar{p}^*$ given by (18) is substituted in (12) to obtain the optimized preceding matrix. We use this optimized preceding matrix even when K is comparable to M.

In the present embodiment, precoding cannot depend on the instantaneous channel as no channel information is available to the users. Hence, we may use explicit selection of users to take advantage of the instantaneous channel variations. The following is an exemplary scheduling strategy for heterogeneous users.

Let $z_1^T, z_2^T, \ldots, z_K^T$ be the rows of the matrix $$Z = \mathrm{diag}\left\{\left[\sqrt{\frac{1+\rho_{r1}\tau_{rp}}{\rho_{r1}\tau_{rp}}} \cdots \sqrt{\frac{1+\rho_{rK}\tau_{rp}}{\rho_{rK}\tau_{rp}}}\right]^T\right\}\hat{H} \quad (19)$$

where $\hat{H}$ is the estimated channel given by (4). Let subscripts (1), (2), ... (K) denote the enumeration of the K users such that $\bar{p}^*_{(1)}\|z_{(1)}^T\|^2 \geq \bar{p}^*_{(2)}\|z_{(2)}\|^2 \geq \ldots \geq \bar{p}^*_{(K)}\|z_{(K)}^T\|^2$. In every coherence interval, the users are ordered in this manner and information symbols are transmitted to the first N users using the preceding matrix formed by the appropriate rows of the optimized preceding matrix as previously described. The value of N is chosen in order to maximize achievable weighted sum rate. We denote this lower bound on achievable weighted sum rate with scheduling by $C_{wt-lb}^{sh}(\cdot)$. Net achievable weighted sum rate may be defined as $$C_{wt-net}(M, K, \rho_f, \rho_r) = \max_{\tau_{rp}} \frac{T - \tau_{rp} - 1}{T} C_{wt-lb}^{sh}(\cdot) \quad (20)$$

subject to the constraints $\tau_{rp} \geq K$ and $\tau_{rp} \leq \min(M, T-2)$.

Numerical simulation results will now be described to show the performance benefits obtained using the techniques of the illustrative embodiments. These results are based on an assumed realistic communication system implementation in which forward and reverse SINRs are low. We consider this implementation since interference from neighboring base stations often forces systems to operate with low SINRs. Moreover, we are interested in high mobility users, and select the system parameters accordingly. Improvements attributable to the use of scheduling with selection of N of K users are illustrated by the plots shown in FIG. 4, while improvements attributable to modified precoding are illustrated by the plots shown in FIG. 5. As mentioned previously herein, the scheduling with selection of N of K users and the modified precoding can be used separately from one another, and are assumed to be used separately from one another in these particular numerical simulations.

Figure 4:
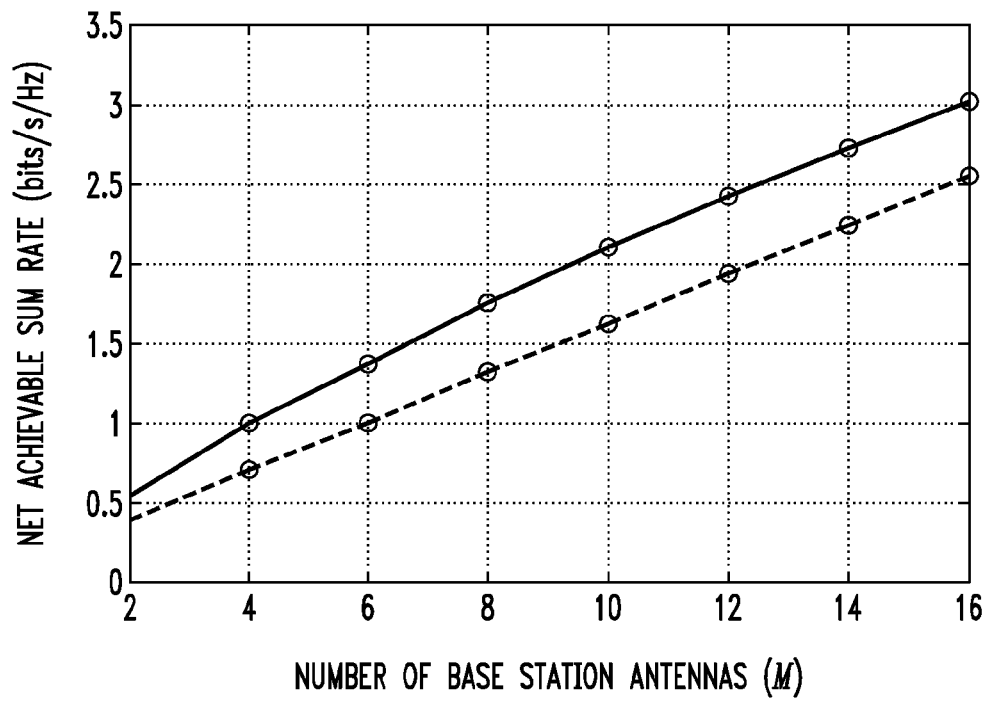
FIGS. 4 and 5 are graphical plots illustrating exemplary improvements in sum rate provided by respective user scheduling and preceding techniques in illustrative embodiments of the invention.

FIG. 4 shows the improvement in net achievable sum rate in bits per second per Hertz (bits/s/Hz) as a function of number of base stations antennas M, attributable to scheduling with selection of N of K users, in the case of homogeneous users. This example assumes that the homogeneous users each have a forward SINR of 0 dB and a reverse SINR of −10 dB, and further assumes a coherence interval of T=30 symbols. The training length and number of users K are optimized to maximize net throughput.

The lower curve in FIG. 4 corresponds to a system without selection of N of K users, that is, a system with transmission to all K users, while the upper curve corresponds to a system with selection of N of K users. Neither system utilizes the modified precoding described above. It can be seen from FIG. 4 that a system that schedules users based on selection of N of K users provides a significant increase in throughput, as measured by net achievable sum rate, relative to a system without such scheduling.

Figure 5:
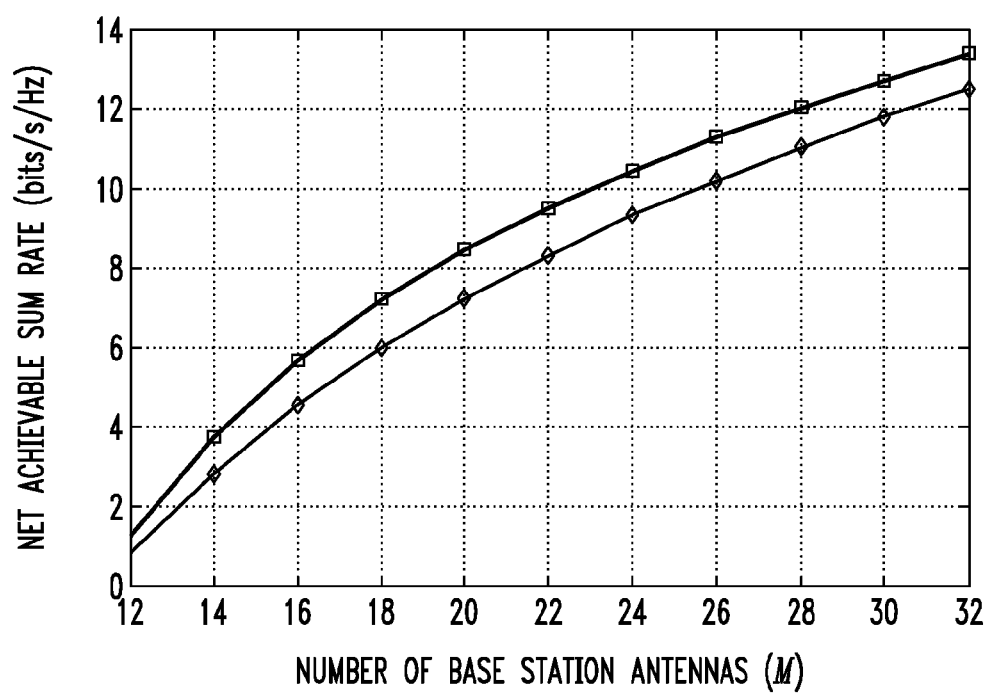

With reference now to FIG. 5, the improvement in net achievable sum rate attributable to modified preceding is shown as a function of number of base station antennas M, in the case of heterogeneous users. This example assumes K=12 users with forward SINRs 0, 0, 0, 5, 5, 5, 5, 5, 5, 10, 10, 10 dB and a coherence interval of T=30 symbols. The reverse SINR associated with each user is taken to be 10 dB lower than its forward SINR.

The lower curve in FIG. 5 corresponds to a system without modified precoding, while the upper curve corresponds to a system with modified preceding. Neither system utilizes the selection of N of K users described above. It can be seen from FIG. 5 that a system that incorporates the modified preceding provides a significant increase in throughput, as measured by net achievable sum rate, relative to a system without such modified preceding.

As noted previously, other embodiments of the invention may incorporate both scheduling based on selection of N of K users as well as modified preceding, and such embodiments under similar operating assumptions can be expected to achieve improvements in throughput that are greater than those illustrated in FIGS. 4 and 5 for either technique alone.

Advantageously, the scheduling and preceding techniques of the illustrative embodiments can significantly improve the throughput of multi-user MIMO systems. This throughput improvement is achieved without requiring any increase in transmission power or other system resource.

It should again be emphasized that the embodiments described above are presented by way of illustrative example only. Other embodiments may use different system configurations, scheduling techniques, preceding techniques, etc. depending on the needs of the particular communication application.

For example, the present invention does not require any particular channel vector configuration. Thus, the term "channel vector" as used herein is intended to be construed broadly, so as to encompass a variety of different arrangements of information which characterize a channel between a base station and a wireless terminal.

Various embodiments of the present invention may make use of time slotted transmission of the type described in U.S. patent application Ser. No. 11/553,191, filed Oct. 26, 2006 and entitled "MIMO Communication System with Variable Slot Structure," which is commonly assigned herewith and incorporated by reference herein.

The particular MIMO system configuration shown in FIGS. 1 and 2 and the scheduling process shown in FIG. 3 may be altered in other embodiments. Also, the particular techniques for obtaining channel vectors, selecting a subset of users based on channel vector magnitudes, computing a preceding matrix, and utilizing the preceding matrix to control transmission to the selected subset of users as described herein may be altered to accommodate particular applications. These and numerous other alternative embodiments within the scope of the appended claims will be readily apparent to those skilled in the art.

What is claimed is:

1. A method of communicating information in a multiple-input, multiple-output communication system in which a base station communicates with multiple terminals, the method comprising the steps of:
   obtaining channel vectors for respective ones of the terminals;
   selecting a subset of the terminals based on magnitudes of the respective channel vectors;
   computing a precoding matrix using the channel vectors of the selected subset of terminals; and
   utilizing the precoding matrix to control transmission to the selected subset of terminals.

2. The method of claim 1 wherein the step of selecting the subset of the terminals further comprises selecting from among K terminals those N terminals having the largest channel vector magnitudes, where N<K.

3. The method of claim 1 wherein the obtaining, selecting, computing and utilizing steps are repeated for each of a plurality of coherence intervals with potentially different subsets of terminals being selected in each of the coherence intervals.

4. The method of claim 1 wherein the multiple-input, multiple-output communication system comprises a time-division duplex (TDD) multiple-input, multiple-output communication system.

5. The method of claim 2 wherein the base station communicates with the multiple terminals via a set of M base station antennas, and a forward channel between the base station and the K terminals is characterized by a K×M matrix H.

6. The method of claim 5 wherein the base station obtains the channel vectors by computing an estimate $\hat{H}$ of the forward channel matrix H, wherein the channel vectors comprise respective rows of the estimated forward channel matrix $\hat{H}$ and the estimated forward channel matrix $\hat{H}$ is computed based on training sequences transmitted by the respective terminals to the base station over a reverse channel.

7. The method of claim 6 wherein the step of selecting from among K terminals those N terminals having the largest channel vector magnitudes further comprises forming an N×M matrix $\hat{H}_{S_N} = [\hat{h}_{(1)} \hat{h}_{(2)} \ldots \hat{h}_{(N)}]^T$ where $\hat{h}_{(1)}^T, \hat{h}_{(2)}^T, \ldots, \hat{h}_{(K)}^T$ comprise rows of the estimated forward channel matrix $\hat{H}$ arranged in order of decreasing channel vector magnitudes.

8. The method of claim 7 wherein the step of computing a precoding matrix further comprises the step of computing the precoding matrix as $$A_{S_N} = \frac{\hat{H}_{S_N}^\dagger (\hat{H}_{S_N} \hat{H}_{S_N}^\dagger)^{-1}}{\sqrt{tr\left[(\hat{H}_{S_N} \hat{H}_{S_N}^\dagger)^{-1}\right]}}$$

where $(\cdot)^\dagger$ and $tr(\cdot)$ denote Hermitian conjugate and trace operations, respectively.

9. The method of claim 8 wherein the precoding matrix is normalized so that $tr(A_{S_N}^\dagger A_{S_N}) = 1$.

10. The method of claim 5 wherein the step of utilizing the precoding matrix to control transmission to the selected subset of terminals further comprises forming an M×1 transmission signal vector $s_f$ by premultiplying an information symbol vector $q = [q_1 \; q_2 \; \ldots \; q_N]^T$ by the precoding matrix.

11. A non-transitory processor-readable storage medium having embodied therein instruction code which when executed by a processor of a base station causes the base station to perform the steps of the method of claim 1.

12. A base station of a multiple-input, multiple-output communication system, the base station being configured to communicate with multiple terminals of the system, the base station comprising:
    an antenna array comprising a plurality of antennas for communicating with the multiple terminals;
    transceiver circuitry coupled to the antennas of the antenna array; and
    a processor coupled to the transceiver circuitry;
    wherein the base station is operative to obtain channel vectors for respective ones of the terminals, to select a subset of the terminals based on magnitudes of the respective channel vectors, to compute a precoding matrix using the channel vectors of the selected subset of terminals, and to utilize the precoding matrix to control transmission to the selected subset of terminals.

13. The base station of claim 12:
    wherein said processor is configured to obtain the channel vectors, to select the subset of the terminals, to compute the precoding matrix, and to utilize the precoding matrix to control transmission.

14. The base station of claim 12 wherein the base station selects the subset of terminals by selecting from among K terminals those N terminals having the largest channel vector magnitudes, where N<K.

15. A multiple-input, multiple-output communication system comprising:
    a plurality of terminals; and
    at least one base station configured to communicate with the terminals;
    wherein the base station is operative to obtain channel vectors for respective ones of the terminals, to select a subset of the terminals based on magnitudes of the respective channel vectors, to compute a precoding matrix using the channel vectors of the selected subset of terminals, and to utilize the precoding matrix to control transmission to the selected subset of terminals.

16. The system of claim 15 wherein the base station selects the subset of terminals by selecting from among K terminals those N terminals having the largest channel vector magnitudes, where N<K.

17. A method of communicating information in a multiple-input, multiple-output communication system in which a base station communicates with multiple terminals, the method comprising the steps of:
    obtaining channel vectors for respective ones of the terminals;
    computing a precoding matrix using the channel vectors; and
    utilizing the precoding matrix to control transmission to the terminals;
    wherein the precoding matrix is computed as a function of a product of a diagonal matrix and an estimated forward channel matrix.

18. The method of claim 17 wherein the base station obtains the channel vectors by computing an estimated forward channel matrix $\hat{H}$ based on training sequences transmitted by the respective terminals to the base station over a reverse channel.

19. The method of claim 18 wherein the step of computing a precoding matrix further comprises the step of computing the precoding matrix as $$A_D = \frac{\hat{H}_D^\dagger (\hat{H}_D \hat{H}_D^\dagger)^{-1}}{\sqrt{tr\left[(\hat{H}_D \hat{H}_D^\dagger)^{-1}\right]}}$$

where $$\hat{H}_D = D\hat{H}$$

and $$D = \text{diag}\left\{\left[p_1^{-\frac{1}{2}} p_2^{-\frac{1}{2}} \ldots p_K^{-\frac{1}{2}}\right]\right\},$$

K denotes the number of terminals, and $p=[p_1 \, p_2 \ldots p_K]^T$ is a vector of non-negative real numbers, and where $(\cdot)^\dagger$ and $tr(\cdot)$ denote Hermitian conjugate and trace operations, respectively.

20. The method of claim 19 wherein $p=[p_1 \, p_2 \ldots p_K]^T$ is selected to approximately maximize a lower bound on forward channel weighted sum capacity.

21. The method of claim 19 further including the step of selecting from among the K terminals a subset of N terminals to receive transmissions in a given coherence interval by ordering the K terminals such that $\bar{p}^*_{(1)} \|z_{(1)}^T\|^2 \geq \bar{p}^*_{(2)} \|z_{(2)}^T\|^2 \geq \ldots \geq \bar{p}^*_{(K)} \|z_{(K)}^T\|^2$ and selecting the first N of the ordered terminals, where $\bar{p}^*$ is an optimized version of the p vector and $z_{(1)}^T, z_{(2)}^T, \ldots, z_{(K)}^T$ denote rows of a diagonal matrix formed as a function of the estimated forward channel matrix $\hat{H}$.

22. The method of claim 17 wherein the step of utilizing the precoding matrix to control transmission to the terminals further comprises forming an M×1 transmission signal vector $s_f$ by premultiplying an information symbol vector $q=[q_1 \, q_2 \ldots q_K]^T$ by the precoding matrix.

23. A non-transitory processor-readable storage medium having embodied therein instruction code which when executed by a processor of a base station causes the base station to perform the steps of the method of claim 17.

24. A base station of a multiple-input, multiple-output communication system, the base station being configured to communicate with multiple terminals of the system, the base station comprising:
an antenna array comprising a plurality of antennas for communicating with the multiple terminals;
transceiver circuitry coupled to the antennas of the antenna array; and
a processor coupled to the transceiver circuitry;
wherein the base station is operative to obtain channel vectors for respective ones of the terminals, to compute a precoding matrix using the channel vectors, and to utilize the precoding matrix to control transmission to the terminals, wherein the precoding matrix is computed as a function of a product of a diagonal matrix and an estimated forward channel matrix.

* * * * *